D Creighton     Farm Gate
No. 120,573.     Fig. 1.     Patented Nov. 7, 1871.
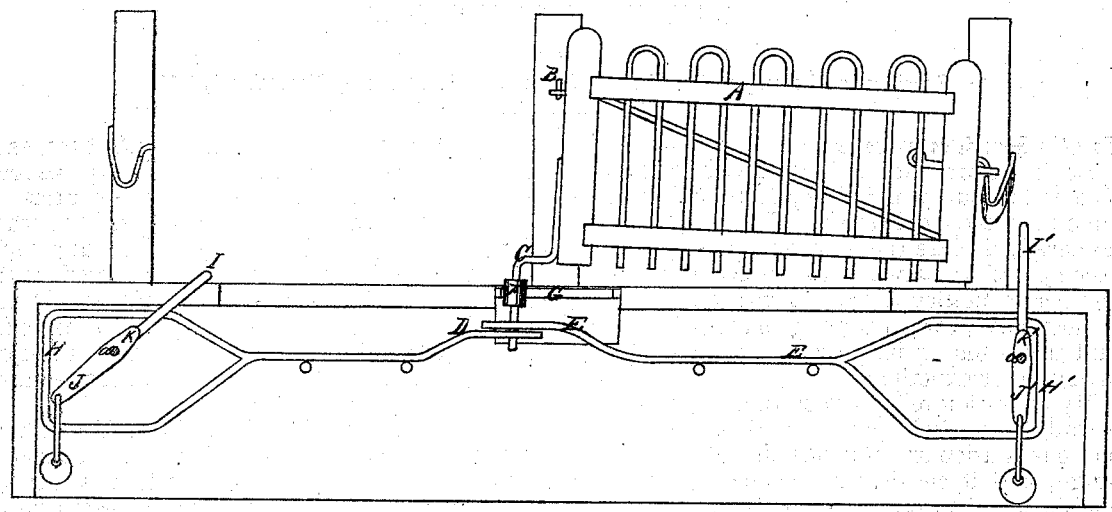
Fig. 2.
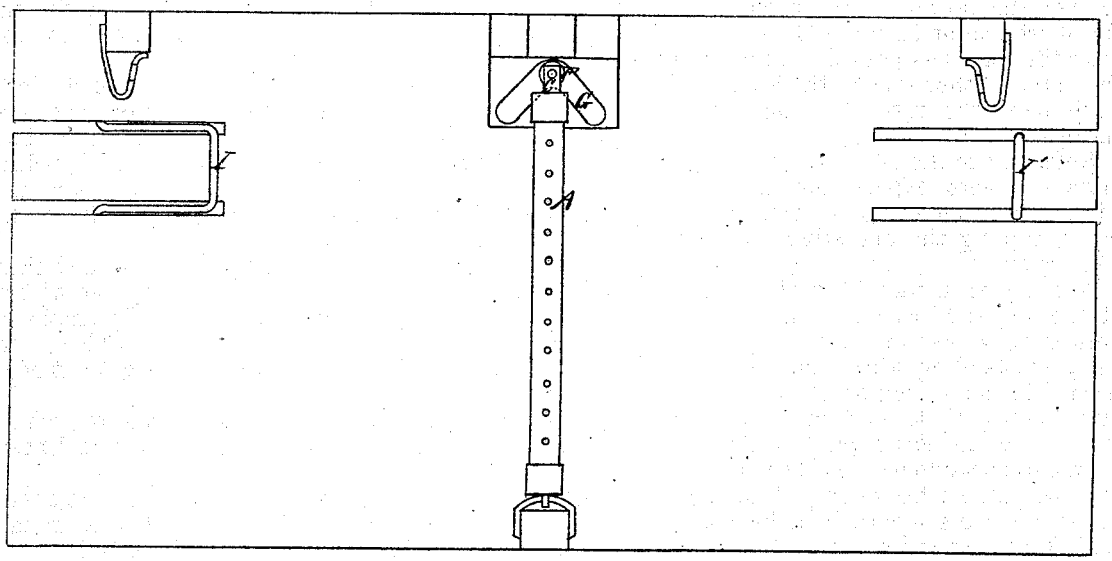
Witnesses            Inventor
Geo. H. Strong        David Creighton
Benjm. C. Fabre      By his Atty's
                                    Dewey & Co.

UNITED STATES PATENT OFFICE.

DAVID CREIGHTON, OF VACAVILLE, CALIFORNIA.

IMPROVEMENT IN GATES.

Specification forming part of Letters Patent No. 120,573, dated November 7, 1871.

*To all whom it may concern:*

Be it known that I, DAVID CREIGHTON, of Vacaville, county of Solano, State of California, have invented an Improved Farm-Gate; and I do hereby declare the following description and accompanying drawing are sufficient to enable any person skilled in the art or science to which it most nearly appertains to make and use my said invention or improvement without further invention or experiment.

My invention relates to certain improvements in automatic farm-gates of that class which has one stationary and one movable pintle or hinge; and it consists in the employment of a double lever at each side of the gate, having one long and one short arm, and so connected with the operating arms and the bails in the road bed that the long arm of one lever serves to open the gate to an approaching team, while the short arm of the other lever closes the gate after the team has passed. After having opened the gate, neither arm of the lever so doing can again move the gate till it has been closed by the other lever.

Referring to the accompanying drawing for a more complete explanation of my invention, Figure 1 is a longitudinal vertical section of the pit containing the operating mechanism. Fig. 2 is a plan.

A is a gate, hung with a stationary hinge, B, at the top, and having a lug or arm, C, at the bottom, which is formed into a pintle. This pintle projects downward and enters the slots formed in the overlapping ends of the two operating bars D E, so that when either of the bars are moved the lower part of the gate will be drawn to one side or the other of a perpendicular line. A friction-roller, F, is placed on the pintle, and this moves in a heart-shaped cam-slot, G, so that when the bottom of the gate is moved to either side it will also be moved toward the road-bed.

This movement elevates the outer end of the gate, unlatching it and placing it at such an angle that gravity will cause it to swing open in a direction opposite to that in which the bottom of the gate-post is moved. In order to accomplish these movements the bars D and E are extended in a line parallel with the road and their outer ends formed into a loop with a vertical end, as at H H'.

Two bails, I I', are so placed in the road-bed that the wheels of the carriage at one side shall pass over one as the team approaches the gate. The axles $a$, around which these bails turn, each carry at one end a double lever, having the long and short arms J and K, and these arms lie within the loops, before described, so that when the bail I is pressed down by a team approaching the gate the long arm J will act against the ends H of the loop. This draws the bars D and E and the bottom of the gate past to that side, the pintle moving in the slot G, and the effect will be to open the gate away from the team, as before described.

This movement of the bars D and E will have brought the opposite side H' of the other loop close against its lever, so that, after the carriage has passed through the gate, the wheels passing over the other bail I' will cause the short arm K' of its lever to act on the looped arm at that side. This throws the pintle and bottom of the gate past back to a central position in the cam G, and the gate will thus be caused to close again.

When the gate is closed the ends of the loops H H' will both be so far away from the lever that neither of the short arms can act on them, and when the gate has been opened by either lever, as it will be done by the long arm, that lever cannot again act on the gate till it has again been closed.

By this simple arrangement of long and short-armed levers I am enabled to dispense with all the cumbrous mechanism ordinarily employed, and provide a gate the action of which is certain, and which is little liable to get out of order.

Having thus described my invention, what I claim, and desire to secure by Letters Patent, is—

1. The looped bars D and E, with the operating levers J K and the bails I I', substantially as and for the purpose herein described.

2. In combination with a gate having one stationary and one movable pintle, as shown, the looped operating bars D and E, and the levers provided with a long arm, J, and a short arm, K, when constructed to operate substantially as and for the purpose described.

In witness that the above-described invention is claimed by me I have hereunto set my hand and seal.

DAVID CREIGHTON. [L. S.]

Witnesses:
JAMES EVERSOLE,
J. D. TILSON.